United States Patent
Jung et al.

(10) Patent No.: US 8,337,100 B2
(45) Date of Patent: Dec. 25, 2012

(54) DOME SECURITY CAMERA

(75) Inventors: Kyung Jung, Seoul (KR); Na Young Kang, Incheon (KR)

(73) Assignee: Powertech Electronics, Incheon (KR)

( * ) Notice: Subject to any disclaimer, the term of this patent is extended or adjusted under 35 U.S.C. 154(b) by 0 days.

(21) Appl. No.: 12/830,037

(22) Filed: Jul. 2, 2010

(65) Prior Publication Data

US 2011/0158637 A1    Jun. 30, 2011

(30) Foreign Application Priority Data

Dec. 30, 2009  (KR) ........................ 10-2009-0134633

(51) Int. Cl.
    *G03B 17/00*      (2006.01)
(52) U.S. Cl. ...................................... 396/427
(58) Field of Classification Search .................. 396/427, 396/428, 535; 348/143, 151, 373–374
    See application file for complete search history.

(56) References Cited

U.S. PATENT DOCUMENTS 5,394,184 A * 2/1995 Anderson et al. ............. 348/151

FOREIGN PATENT DOCUMENTS

| JP | 2008-022120 A | 1/2008 |
| KR | 10-2009-0024567 | 3/2009 |
| KR | 10-2009-0050797 | 5/2009 |

* cited by examiner

*Primary Examiner* — W. B. Perkey
*Assistant Examiner* — Minh Phan
(74) *Attorney, Agent, or Firm* — LRK Patent Law Firm (57) ABSTRACT

Disclosed herein is a dome security camera. The camera includes a housing having a circuit part. A hemispherical cover is coupled to the housing. A camera module includes a casing which has a lens mounted on a central portion thereof and coupled to a barrel, a plurality of LEDs, and a sensor. A bracket is provided in the housing and coupled to the casing in such a way that it is rotated and open or closed. The casing has a hemispherical shape, and an annular coupling step is provided on a lower end of the casing. The bracket is a cylindrical member having an opening on an upper end thereof, and includes an enlarged part provided on the upper end of the opening and coupled to the casing, and a cut groove formed by cutting a side surface of the bracket, with a knob inserted into the cut groove.

4 Claims, 7 Drawing Sheets

PRIOR ART

FIG. 1

PRIOR ART

FIG. 2A

PRIOR ART

FIG. 5B

DOME SECURITY CAMERA

CROSS-REFERENCE TO RELATED APPLICATION

This application claims under 35 U.S.C. §119(a) the benefit of Korean Application No. 10-2009-0134633 filed on Dec. 30, 2009, the entire contents of which are incorporated herein by reference.

BACKGROUND OF THE INVENTION

1. Field of the Invention

The present invention relates generally to dome security cameras and, more particularly, to a dome security camera, in which a knob is provided on the outside of the lower portion of a casing having a sensor and LEDs therein to prevent a dead zone from being created, thus allowing a larger number of LEDS to be installed in the casing, and the knob is disposed on the outside of the casing, thus allowing the position of the sensor to be freely changed without changing the position of the knob, even though the casing is rotated.

2. Description of the Related Art

Generally, security cameras are installed in or outside areas that may need surveillance such as offices, houses, hospitals, banks, and public establishments and are used to control people's entry or prevent crimes. In recent years, the installation of the security cameras is increasing in underground parking lots where the number of crimes is on the rise, roads for illegal parking control, or residential areas where various accidents frequently take place.

The security cameras are classified into standard cameras, zoom cameras, dome cameras, and speed dome cameras. Particularly for the dome cameras, when they are installed in consideration of interior design they are problematic in that a camera is fixed, so that only one point of the associated space is photographed, and thereby the range of the photographed area is limited.

In order to solve the problem, a dome security camera which is constructed so that a lens assembly rotates leftwards/rightwards or upwards/downwards has been proposed.

The dome security camera is constructed to rotate at 360 degrees leftwards/rightwards (hereinafter referred to as 'pan'), and to rotate at 90 degrees upwards/downwards (hereinafter referred to as 'tilt'), so that it is able to photograph all points of the associated space.

As such, recently, the photographing direction of the security camera may be adjusted, and in addition, it is possible to photograph even at night or underground where there is no light (visible rays), owing to an infrared (IR) LED lamp.

Figure 1:
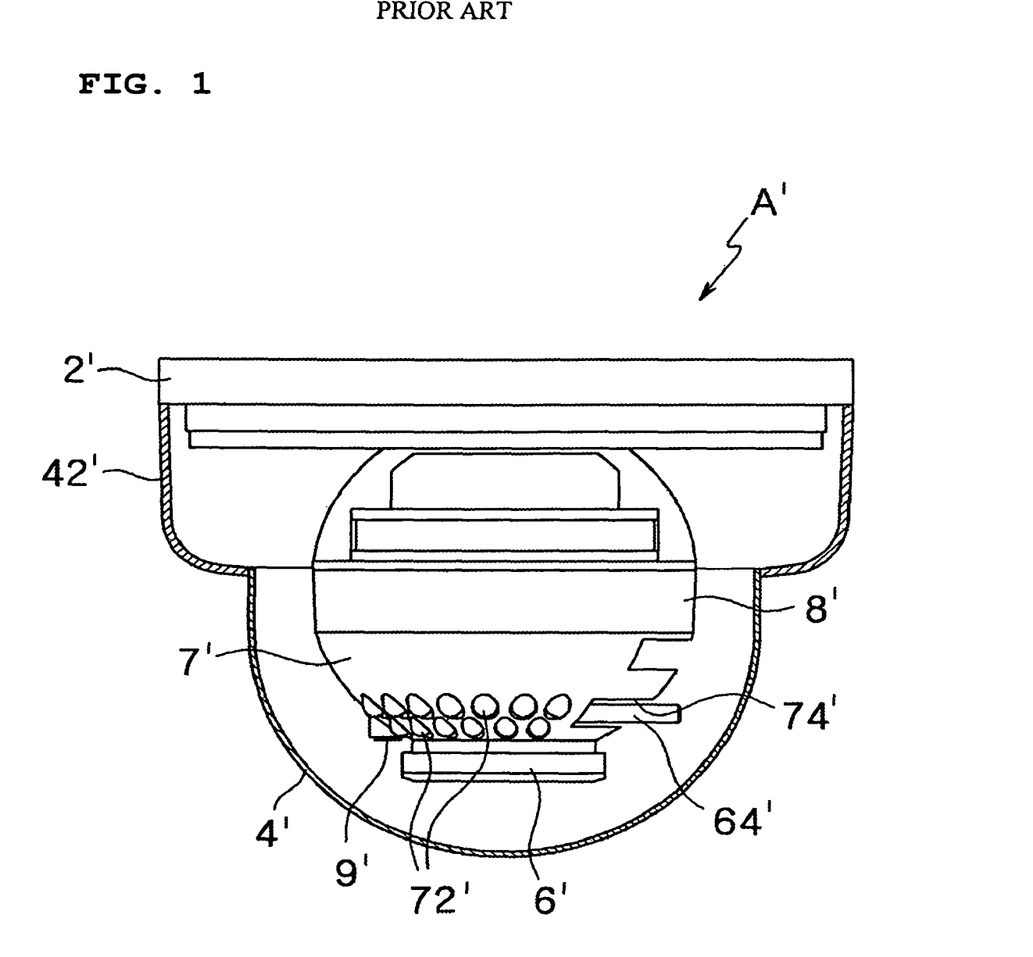
FIG. 1 is a side view showing a conventional dome security camera.
Figure 2A:
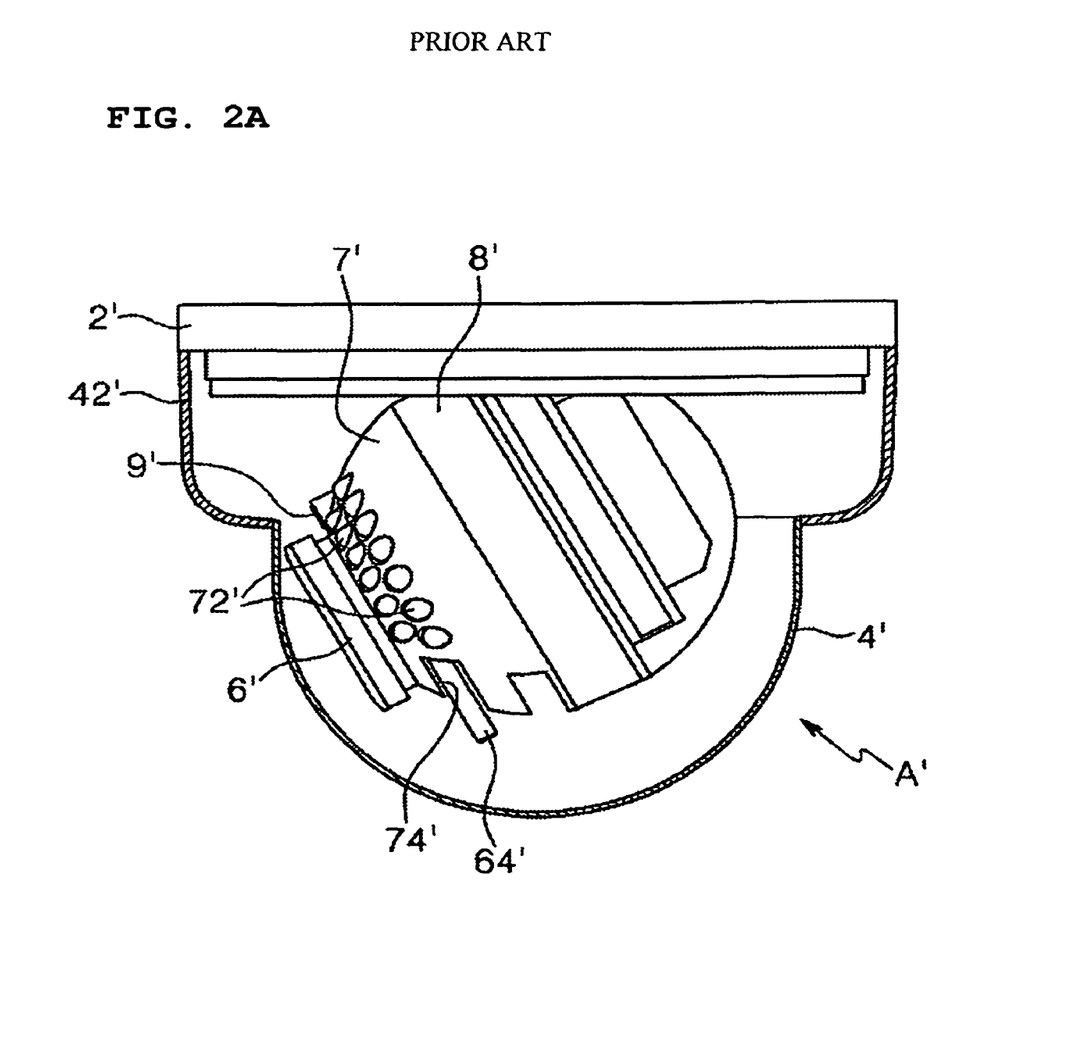
FIGS. 2A and 2B are side views showing an operational example of the conventional dome security camera.
Figure 2B:
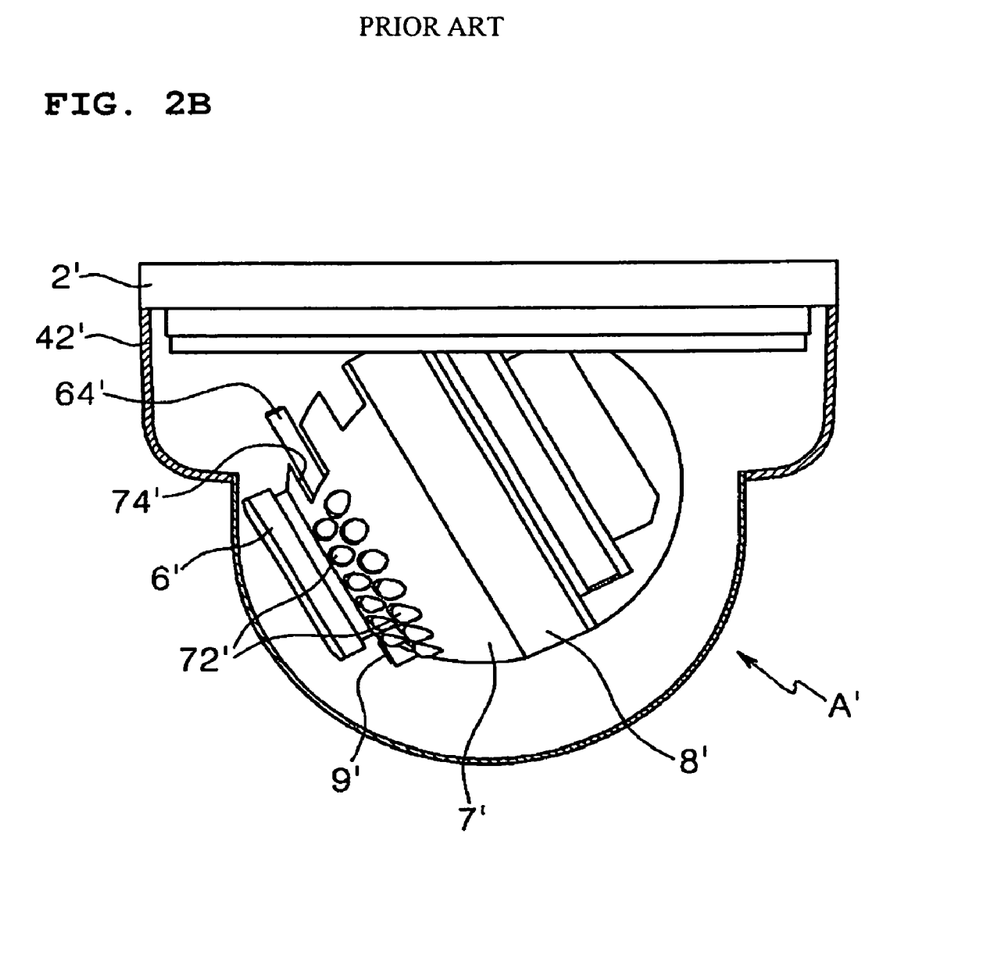

FIG. 1 is a side view illustrating a conventional dome security camera, and FIGS. 2A and 2B are side views illustrating the operational example of the conventional dome security camera.

As shown in FIGS. 1, 2A and 2B, the conventional dome security camera A' includes a housing 2', a hemispherical cover 4', a camera module, and a bracket 8'. A circuit part (not shown) is installed in the housing 2'. The hemispherical cover 4' is coupled to the housing 2'. The camera module includes a casing 7' which has a lens 6' mounted to the central portion thereof, and has a plurality of IR LEDs 72' (hereinafter referred to as 'LED') around the lens 6'. The bracket 8' is provided in the housing 2' so that the casing 7' is rotatably coupled thereto.

Further, the lens 6' is coupled to a barrel. The barrel is constructed so that the lens 6' is moved up and down by rotating a knob 64' provided on a side of the barrel, thus adjusting a focus. The knob 64' passes through an actuating hole 74' formed in the casing 7' in such a way as to be exposed to the outside.

That is, in order to enable the knob 64' to be easily manipulated by hand, the knob 64' is manipulated to be rotated in the actuating hole 74' of a predetermined length which is formed in the side surface of the casing 7'.

Further, a sensor 9' for detecting the movement of a subject is embedded in a portion which is opposite the knob 64'.

The use example of the conventional dome security camera A' will be described. After the cover 4' is separated from the housing 2', the knob 64' is rotated leftwards or rightwards to adjust the focus of the lens 6'. Further, the casing 7' is rotated to determine the proper irradiation angle of the sensor 9', and then the cover 4' is coupled to the housing 2' again.

Meanwhile, as shown in FIG. 2A, when the casing 7' and the lens 6' are maximally moved up to photograph a more distant subject, the sensor 9' is covered by the upper end 42' of the cover 4', thus negatively impacting the functionality.

That is, the cover 4' is made of a transparent material, but the upper end 42' is made of an opaque material, thus causing an error in sensing.

Thus, in order to solve the problems, as shown in FIG. 2B, the casing 7' is rotated so that the position of the sensor 9' is changed to a lower position at which the knob 64' is located, and the position of the knob 64' is changed to an upper position at which the sensor 9' is located. In this case, the knob 64' is shifted to the upper position, so that its height is increased. Thereby, it is difficult to manipulate the camera A' by hand, if the camera A' is mounted to a ceiling.

Further, the conventional security camera is problematic in that the actuating hole 74' into which the knob 64' is fitted occupies a part of the casing 7', so that a space having no LED 72', namely, a dead zone is created, and thus infrared irradiating performance is deteriorated.

SUMMARY OF THE INVENTION

Accordingly, the present invention has been made keeping in mind the above problems occurring in the prior art, and an object of the present invention is to provide a dome security camera, wherein a knob is provided on the outside of the lower portion of a casing having LEDs therein to prevent a dead zone from being created, thus allowing a larger number of LEDs to be installed in the casing, therefore improving infrared irradiating performance.

Another object of the present invention is to provide a dome security camera of which a knob is provided on the outside of the lower portion of a casing to allow the position of a sensor to be freely changed without changing in position of the knob, thus preventing a sensing error from occurring even though the angle of a camera module is adjusted upwards, therefore improving reliability.

In order to accomplish the above objects, the present invention provides a dome security camera, including a housing having a circuit part installed therein; a hemispherical cover coupled to the housing; a camera module including a casing, the casing having a lens mounted on a central portion thereof and coupled to a barrel from which a knob protrudes, a plurality of LEDs provided in an upper surface thereof, and a sensor; and a bracket provided in the housing and coupled to the casing in such a way that the casing is rotated and open or closed. The casing has a hemispherical shape and has on its central portion a hole which receives the lens, with an annular coupling step provided on a lower end of the casing. The bracket is a cylindrical member having an opening on an upper end thereof, and includes an enlarged part which is provided on the upper end of the opening and coupled to the casing, and a cut groove which is formed by cutting a side surface of the bracket, with the knob being inserted into the cut groove.

The enlarged part may include a horizontal annular part extending horizontally from the upper end of the opening, an annular step extending vertically from an end of the horizontal annular part, and a guide groove defined by an arc-shaped guide protrusion protruding from the horizontal annular part. The enlarged part may have an enlarged diameter compared with the upper end of the bracket, and the coupling step of the casing may be coupled to the guide groove so that the casing is rotated and open or closed.

The knob may be located under the coupling step of the casing and pass through the cut groove in such a way as to be exposed to an outside.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiment of the present invention will be described in detail with reference to the accompanying drawings.

Figure 3:
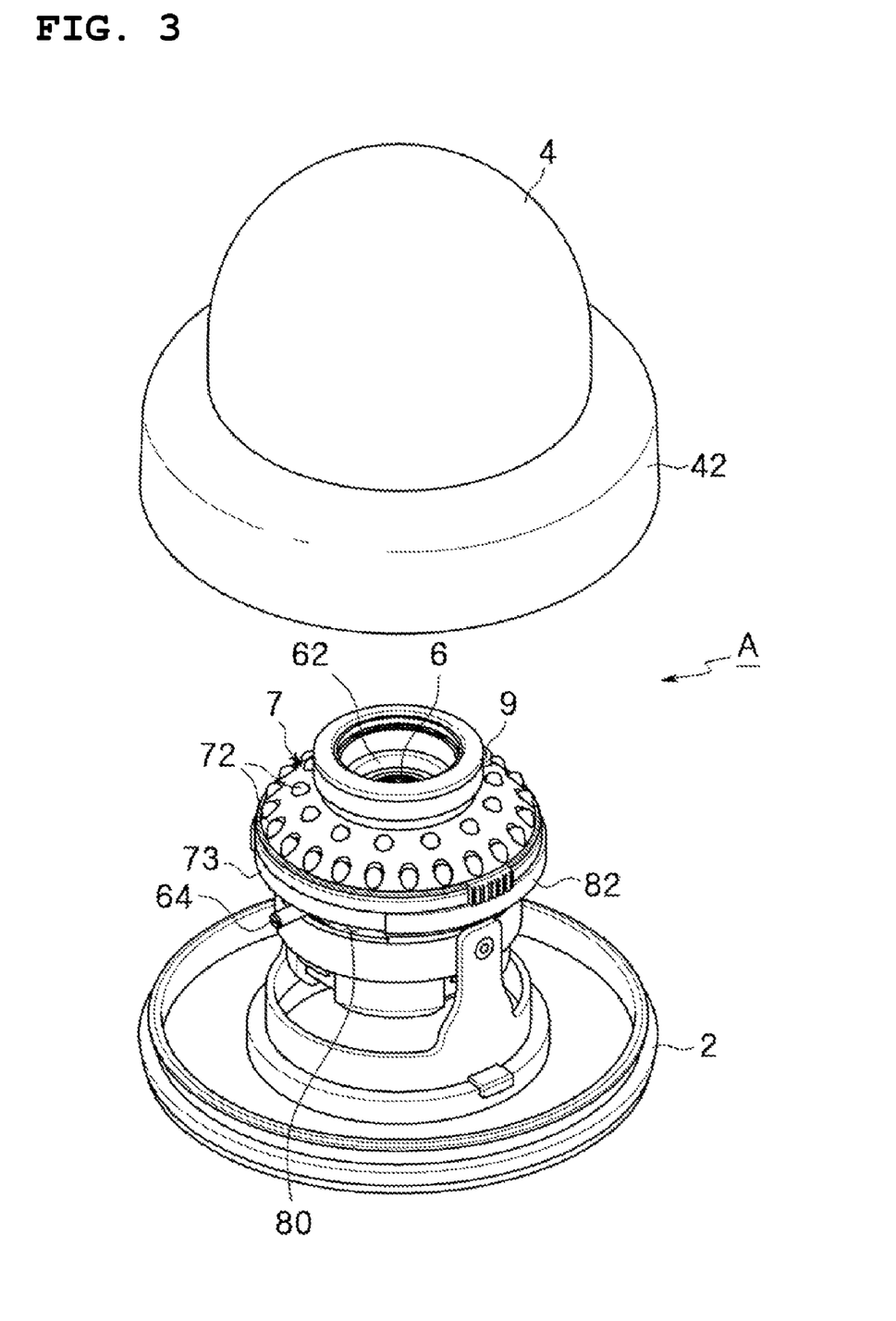
FIG. 3 is an exploded perspective view showing a dome security camera according to the present invention.
Figure 4:
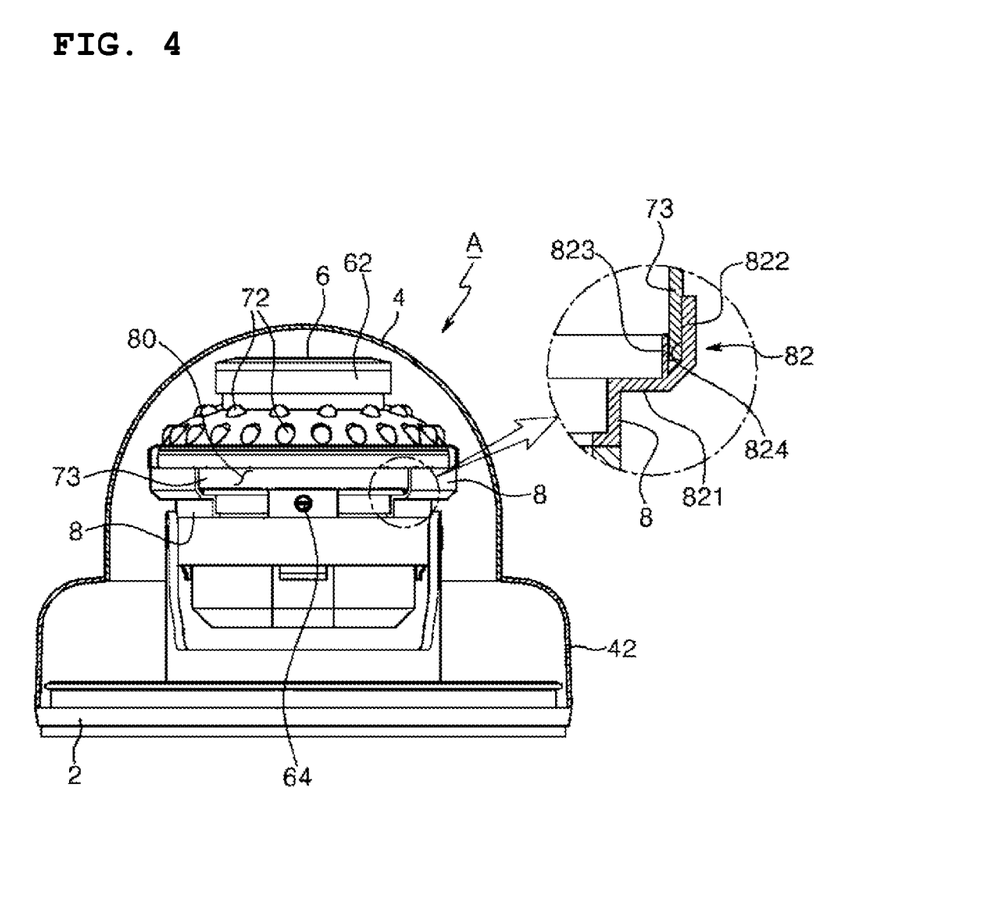
FIG. 4 is a side view showing the assembled state of the dome security camera according to the present invention.
Figure 5A:
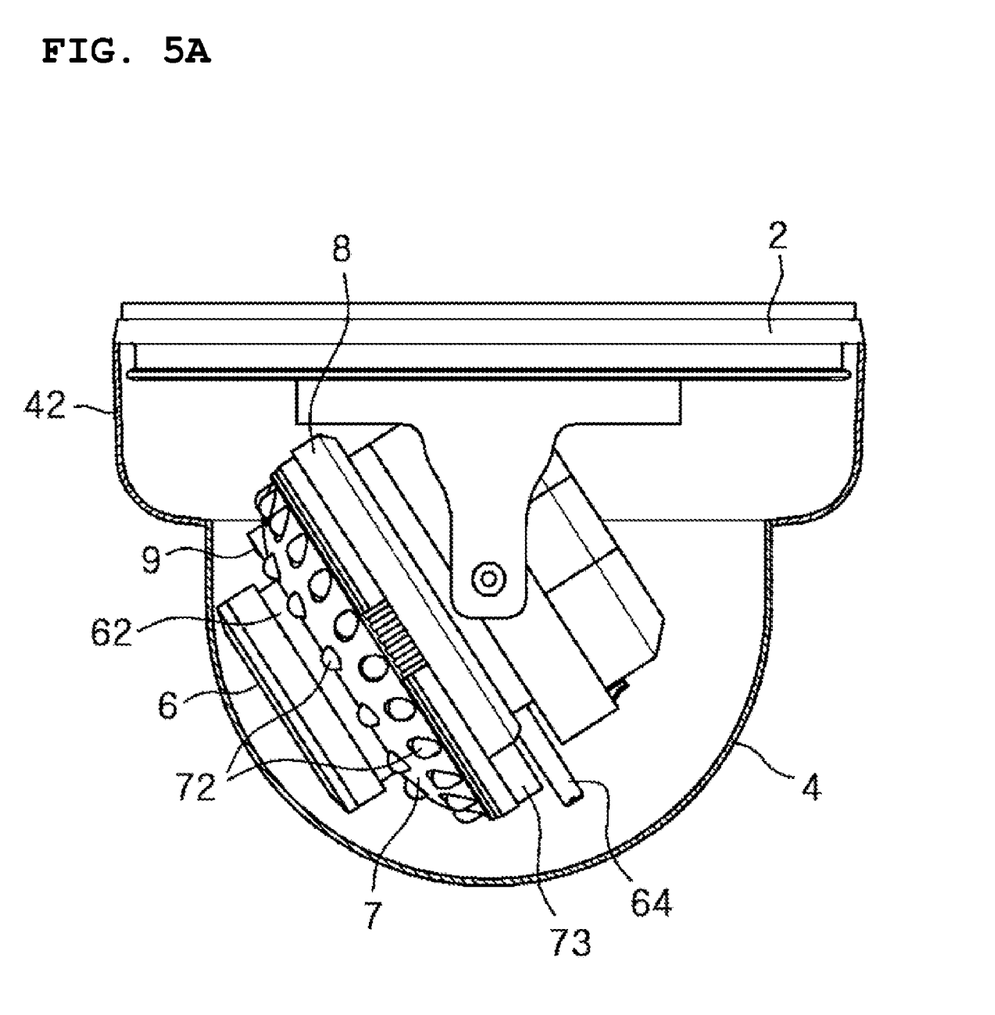
FIGS. 5A and 5B are side views showing an operational example of the dome security camera according to the present invention.
Figure 5B:
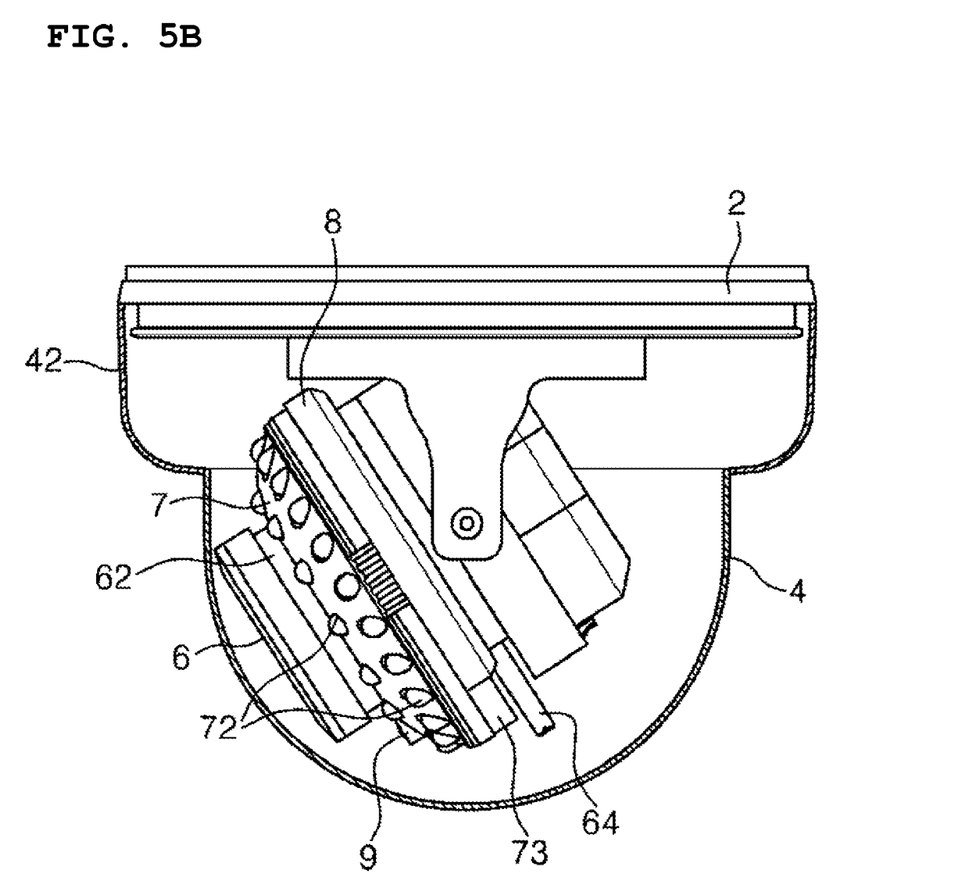

FIG. 3 is an exploded perspective view showing a dome security camera according to the present invention, FIG. 4 is a side view showing the assembled state of the dome security camera according to the present invention, and FIGS. 5A and 5B are side views showing an operational example of the dome security camera according to the present invention.

As shown in FIGS. 3 to 5A and 5B, the dome security camera A according to the present invention includes a housing 2, a cover 4, a camera module, and a bracket 8. A circuit part is installed in the housing 2. The cover 4 is coupled to the housing 2. The camera module has a casing 7 which has a lens 6 mounted on the central portion thereof, the lens 6 being coupled to a barrel 62 from which a knob 64 protrudes. A plurality of LEDs is installed in the upper surface of the casing 7, and a sensor 9 is mounted to the casing 7. The bracket 8 is provided in the housing 2, so that the casing 7 is coupled to the bracket 8 in such a way as to be rotated and open or closed.

Particularly, the casing 7 has a hemispherical shape, and the lens 6 is coupled to the central portion of the casing 7. An annular coupling step 73 is provided on the lower end of the casing 7.

The coupling step 73 has the shape of a circle which protrudes from the lower end of the casing 7, and has a diameter smaller than that of the casing 7.

Further, the bracket 8 functions to guide the casing 7 so that it can be rotated in a horizontal direction, with the coupling step 73 of the casing 7 being coupled to the bracket 8. Such a bracket 8 is a cylindrical member which has at its upper end an opening. The bracket 8 has, on the upper end of the opening, an enlarged part 82 to which the casing 7 is coupled. The bracket 8 is cut at a side surface thereof to form a cut groove 80, so that the knob 64 is inserted into the cut groove 80.

The enlarged part 82 is provided on the upper end of the bracket 8, and has an enlarged diameter compared with the upper end of the bracket 8, so that the coupling step 73 of the casing 7 is fitted into the enlarged part 82.

The enlarged part 82 includes a horizontal annular part 821, an annular step 822, and a guide groove 824. The horizontal annular part 821 extends horizontally from the opening which is provided on the upper end of the bracket 8. The annular step 822 extends vertically from an end of the horizontal annular part 821. An arc-shaped guide protrusion 823 protrudes from the horizontal annular part 821, thus defining the guide groove 824.

Thus, the coupling step 73 of the casing 7 is coupled to the guide groove 824, so that the casing 7 can be rotated.

The knob 64 is positioned under the coupling step 73 provided on the lower end of the casing 7, and is mounted to pass through the cut groove 80 and be exposed to the outside.

Thus, the knob 64 is rotated in the cut groove 80 to rotate the barrel, thus adjusting the focus of the lens 6.

The operational example of the present invention will be described below.

As shown in FIG. 5A, when the casing 7 and the lens 6 are adjusted to face upwards, the sensor 9 is covered by the upper end 42 of the cover 4.

In order to solve the problem, as shown in FIG. 5B, the casing 7 is rotated so that the sensor 9 is located at a lower position.

Even though the casing 7 is rotated in this way, the knob 64 does not obstruct the rotation of the casing 7. That is, since the knob 64 is spaced apart from the lower portion of the casing 7, the position of the sensor 9 may be changed, so that it is possible to freely position the sensor 9.

As described above, the present invention provides a dome security camera, wherein a dead zone caused by the installation of a conventional knob is essentially eliminated, thus allowing a larger number of LEDs to be installed, therefore improving infrared irradiating performance.

Further, the present invention provides a dome security camera, wherein a knob is provided on the outside of the lower portion of a casing to allow the position of a sensor to be freely changed without changing the position of the knob, thus preventing a sensing error from occurring, therefore improving reliability.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A dome security camera, comprising:
   a housing having a circuit part installed therein;
   a cover coupled to the housing;
   a camera module including a casing, the casing having a lens mounted on a central portion thereof and coupled to a barrel from which a knob protrudes, the knob moving the lens up and down in a lens focusing action, a plurality of LEDs provided in an upper surface of the casing, and a sensor; and a bracket provided in the housing and coupled to the casing, whereby the casing rotates between a plurality of preselected positions while the knob is maintained in a fixed and stationary position wherein the casing has a hemispherical shape and the lens coupled to a central portion thereof, with an annular coupling step provided on a lower end of the casing, and the bracket is a cylindrical member having an opening on an upper end thereof, and includes an enlarged part which is provided on the upper end of the opening and coupled to the casing, and a cut groove which is formed by cutting a side surface of the bracket, with the knob being inserted into the cut groove.

2. The dome security camera as set forth in claim 1, wherein the enlarged part comprises:

a horizontal annular part extending horizontally from the upper end of the opening of the bracket; an annular step extending vertically from an end of the horizontal annular part; and a guide groove defined by an arc-shaped guide protrusion protruding from the horizontal annular part, wherein the coupling step of the casing is coupled to the guide groove.

3. The dome security camera as set forth in claim 1, wherein the knob is located under the coupling step provided on the lower end of the casing, and passes through the cut groove in such a way as to be exposed to an outside.

4. The dome security camera as set forth in claim 1, wherein the coupling step of the casing has a shape of a circle protruding from the lower end, and has a diameter smaller than that of the casing.

* * * * *